United States Patent
Na et al.

(10) Patent No.: US 9,053,658 B2
(45) Date of Patent: Jun. 9, 2015

(54) DISPLAY SYSTEM INCLUDING A DISPLAY APPARATUS AND AN UPGRADING APPARATUS, AND CONTROL METHOD

(71) Applicant: SAMSUNG ELECTRONICS CO., LTD., Suwon-si (KR)

(72) Inventors: Hong-ju Na, Suwon-si (KR); Ho-woong Kang, Yongin-si (KR); Kil-soo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 163 days.

(21) Appl. No.: 13/755,828

(22) Filed: Jan. 31, 2013

(65) Prior Publication Data

US 2013/0194302 A1 Aug. 1, 2013

(30) Foreign Application Priority Data

Jan. 31, 2012 (KR) .................. 10-2012-0009802
Jan. 31, 2012 (KR) .................. 10-2012-0010080
Aug. 14, 2012 (KR) .................. 10-2012-0088823

(51) Int. Cl.
| G09G 5/00 | (2006.01) |
| H04N 21/485 | (2011.01) |
| G06F 3/14 | (2006.01) |
| G06F 9/44 | (2006.01) |
| G06F 9/445 | (2006.01) |

(52) U.S. Cl.
CPC ........... *G09G 5/006* (2013.01); *H04N 21/4854* (2013.01); *G06F 3/14* (2013.01); *G06F 8/65* (2013.01); *G09G 5/003* (2013.01); *G09G 2320/0606* (2013.01); *G09G 2340/12* (2013.01); *G09G 2354/00* (2013.01); *G09G 2370/04* (2013.01); *G06F 9/4443* (2013.01)

(58) Field of Classification Search
CPC .................................................. H04N 21/4854
See application file for complete search history.

(56) References Cited

U.S. PATENT DOCUMENTS

| 2003/0100301 | A1 | 5/2003 | Fujii |
| 2005/0097543 | A1 | 5/2005 | Hirayama |
| 2005/0243208 | A1* | 11/2005 | Huang .......................... 348/553 |

(Continued)

FOREIGN PATENT DOCUMENTS

| EP | 2136294 A1 | 12/2009 |
| EP | 2381315 A2 | 10/2011 |

(Continued)

OTHER PUBLICATIONS

Communication dated Sep. 24, 2013, issued by the European Patent Office in counterpart European Application No. 13151820.1.
Communication dated Mar. 5, 2015, issued by the European Patent Office in counterpart European Application No. 13151820.1.

*Primary Examiner* — Jeffery A Brier
(74) *Attorney, Agent, or Firm* — Sughrue Mion, PLLC

(57) ABSTRACT

A display system including a display apparatus and an upgrading apparatus are provided along with a control method. A display apparatus includes an image processor which processes an image signal, a display which displays the processed image thereon, a connector to which an upgrading apparatus comprising at least one upgrading function is connected and a controller which communicates with the upgrading apparatus and controls the display to display thereon a user interface (UI) screen displaying at least one upgrading function list generated by the upgrading apparatus in response to a user selection.

23 Claims, 13 Drawing Sheets

(56) References Cited

U.S. PATENT DOCUMENTS

| | | | |
|---|---|---|---|
| 2008/0036919 A1* | 2/2008 | Lee | 348/739 |
| 2008/0127159 A1 | 5/2008 | Regenmorter | |
| 2009/0300620 A1 | 12/2009 | Park et al. | |
| 2010/0017821 A1 | 1/2010 | Leonov et al. | |
| 2010/0064324 A1* | 3/2010 | Jenkin et al. | 725/59 |
| 2010/0064335 A1* | 3/2010 | Jenkin et al. | 725/110 |
| 2010/0211699 A1* | 8/2010 | Chang et al. | 710/13 |
| 2011/0085082 A1 | 4/2011 | Jing et al. | |

FOREIGN PATENT DOCUMENTS

| | | | |
|---|---|---|---|
| KR | 20030037382 A | | 5/2003 |
| KR | 20050021726 A | * | 3/2005 |
| KR | 1020060080688 A | | 7/2006 |
| KR | 102008007889 A | | 1/2008 |

\* cited by examiner

DISPLAY SYSTEM INCLUDING A DISPLAY APPARATUS AND AN UPGRADING APPARATUS, AND CONTROL METHOD

CROSS-REFERENCE TO RELATED APPLICATION

This application claims priorities from Korean Patent Applications No. 10-2012-0009802, filed on Jan. 31, 2012, No. 10-2012-0010080, filed on Jan. 31, 2012 and No. 10-2012-0088823, filed on Aug. 14, 2012 in the Korean Intellectual Property Office, the disclosures of which are incorporated herein by reference, in their entirety.

BACKGROUND

1. Field

Methods and apparatuses consistent with the exemplary embodiments relate to a display apparatus, an upgrading apparatus which upgrades the display apparatus, a display system which includes the display apparatus and the upgrading apparatus and a control method. More particularly, the exemplary embodiments relate a display system including a display apparatus and an upgrading apparatus, and a method of controlling the same, which performs an upgrading function selected by a user from functions provided by the upgrading apparatus which is connected to the display apparatus, and which generates an upgrading overlay provided by the upgrading apparatus.

2. Description of the Related Art

A display apparatus processes image signals/image data which are supplied by various image supply sources or stored therein, and displays an image on a display panel based on the processed image signals/image data. For example, the display apparatus may be implemented as a TV.

Functions of the display apparatus are diversified or extended in accordance with the development of technology or in accordance with the environment surrounding the display apparatus. Thus, an upgrading apparatus is needed to provide an upgrading function in order for the display apparatus to obtain a new function or diversified function.

When functions or specifications of the display apparatus are upgraded through the upgrading apparatus, an overlay which displays a menu screen, etc., should be upgraded.

However, an upgrading apparatus which is provided by a manufacturer may have functions which users may consider to be unnecessary.

SUMMARY

Accordingly, one or more exemplary embodiments provide a display system including a display apparatus, an upgrading apparatus and a control method which generates an improved upgraded overlay.

Another exemplary embodiment provides a display system which includes a display apparatus and an upgrading apparatus, and a control method which only performs an upgrading function out of various functions of the upgrading apparatus as desired by a user according to a user's selection.

The foregoing and/or other aspects may be achieved by providing a display apparatus including: an image processor which processes an image signal; a display which displays the processed image thereon; a connector to which an upgrading apparatus including at least one upgrading function is connected; and a controller which communicates with the upgrading apparatus and controls the display to display thereon a user interface (UI) screen displaying at least one upgrading function list generated by the upgrading apparatus.

The display apparatus may further include a user input which receives a user's selection, wherein the controller controls the at least one upgrading function selected by a user from the at least one upgrading function list to be performed.

Also, the controller may control the upgrading apparatus to generate a UI screen displaying the at least one upgrading function list which is selected.

Also, the selected at least one upgrading function list may be changed according to a user's input, and the controller controls the upgrading function which corresponds to the changed selection which is to be performed.

Also, the controller may communicate with the upgrading apparatus in order for the upgrading apparatus to generate an overlay screen, and overlaps a main screen on the display to control the display in order to display the overlay screen generated by the upgrading apparatus.

Also, the display apparatus may further include an overlay generator, wherein the controller overlaps a main screen on the display to control the display in order to display at least one of the overlay screen generated by the overlay generator and the overlay screen generated by the upgrading apparatus.

Also, the display apparatus may further include an overlay generator which generates a first overlay screen and may further include an overlay decoder which decodes overlay screen data encoded by the upgrading apparatus, wherein the controller communicates with the upgrading apparatus for the upgrading apparatus in order to encode overlay screen data, and overlaps a main screen on the display to control the overlay decoder in order to decode the encoded overlay screen data, controls the overlay generator to generate a second overlay screen and controls the display to display the second overlay screen.

Also, the controller may overlap a main screen on the display in order to control the display to display at least one of the first overlay screen and the second overlay screen.

The foregoing and/or other aspects of the exemplary embodiments may be achieved by providing an upgrading apparatus of a display apparatus including: a connector which is connected to the display apparatus; a UI generator; and a controller which controls the UI generator to generate a UI screen displaying at least one upgrading function list and transmits the generated UI screen to the display apparatus, in response to the display apparatus being connected to the upgrading apparatus.

Also, the controller may control the UI generator to generate a UI screen displaying at least one upgrading function list selected by a user's selection input to the display apparatus.

Also, the controller may control the UI generator to generate a UI screen displaying an upgrading function list which corresponds to the changed selection in response to the user's selection input to the display apparatus being changed.

Also, the upgrading apparatus may further include an overlay generator which generates an overlay screen, wherein the controller communicates with the display apparatus, controls the overlay generator to generate an overlay screen and transmits the generated overlay screen to the display apparatus through the connector.

The upgrading apparatus may further include an overlay encoder which encodes overlay screen data, wherein the controller communicates with the display apparatus, controls the overlay encoder to encode overlay screen data, and transmits the encoded overlay screen data to the display apparatus through the connector.

The controller may upgrade the display apparatus to generate an overlay screen based on the encoded screen data.

The foregoing and/or other aspects of the exemplary embodiments may be achieved by providing a method of controlling a display apparatus including: connecting an upgrading apparatus including at least one upgrading function; communicating with the upgrading apparatus to generate an UI screen displaying at least one upgrading function list; and receiving a UI screen generated by the upgrading apparatus and displaying the UI screen on the display.

The method of controlling a display apparatus may further include receiving a user's selection regarding at least one of the at least one upgrading function list.

The method of controlling a display apparatus may further include controlling at least one upgrading function to be performed, which was selected by the user.

The foregoing and/or other aspects may be achieved by providing a method of controlling an upgrading apparatus of a display system including: connecting the display apparatus; and generating a UI screen displaying at least one upgrading function list and transmitting the UI screen to the display apparatus in response to the display apparatus being connected.

The method of controlling a display apparatus may further include generating a UI screen displaying at least one upgrading function list that is input to the display apparatus through a user's selection.

The method of controlling a display apparatus may further include generating a UI screen displaying an upgrading function list which corresponds to the changed selection in response to a change to the user's input selection to the display apparatus.

The foregoing and/or other aspects of the exemplary embodiments may be achieved by providing a display system including: a display apparatus which includes a display; an upgrading apparatus which is connected to the display apparatus and includes at least one upgrading function, wherein the display apparatus receives a UI screen generated by the upgrading apparatus and displaying the at least one upgrading function list on the display.

In addition, the upgrading apparatus may encode overlay screen data, and the display apparatus may receive the encoded overlay screen data, decode the encoded overlay screen data and display an overlay screen generated on the basis of the decoded overlay screen data, by overlapping a main screen on the display.

An exemplary embodiment may further provide a display apparatus including: an image processor which processes an image signal; a display which displays the processed image; a connector adapted to be connected to an upgrading apparatus; and a controller which communicates with the upgrading apparatus and controls the display of a user interface (UI) which is adapted to display at least one upgrading function list generated by the upgrading apparatus. The display apparatus may further include a user input which receives a user's selection of an upgrading function, wherein the controller controls the at least one upgrading function selected by a user.

An exemplary embodiment may provide an upgrading apparatus including: a connector which is adapted for connection to a display apparatus; a UI generator; and a controller which controls the UI generator to generate a UI screen which displays at least one upgrading function list and is adapted to transmit the generated UI screen to the display apparatus.

An exemplary embodiment may further include a method of controlling a display apparatus, including: connecting an upgrading apparatus comprising at least one upgrading function to the display apparatus; and receiving a UI screen generated by the upgrading apparatus and displaying the UI screen on the display.

An exemplary embodiment may further include a display system including: a display apparatus; an upgrading apparatus connected to the display apparatus; the upgrading apparatus includes at least one upgrading function list, wherein the display apparatus receives and displays an upgraded function list generated by the upgrading apparatus.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
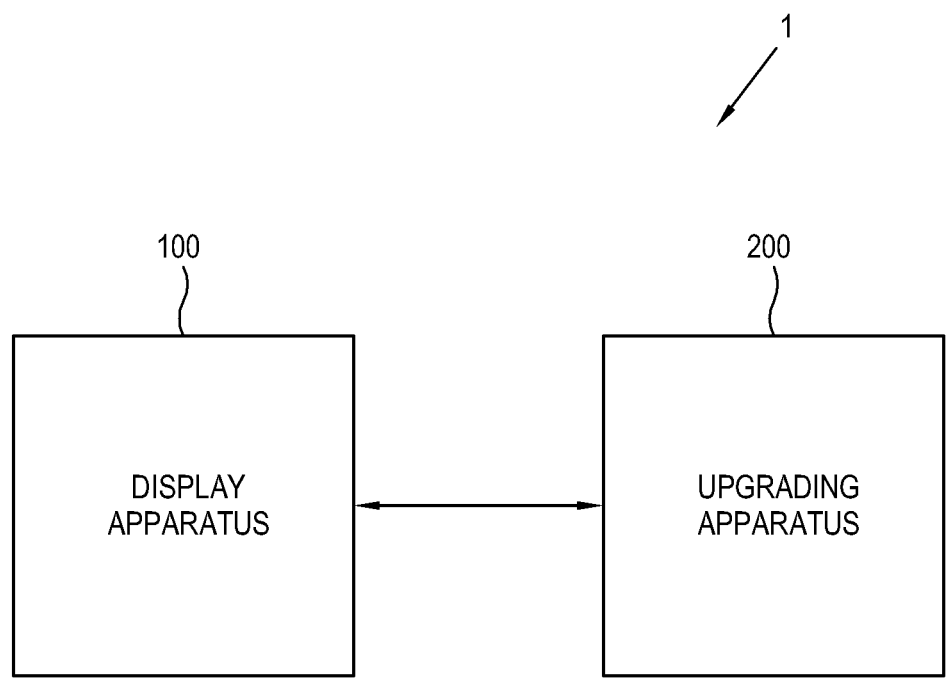
FIG. 1 is a block diagram of a display system according to an exemplary embodiment.

Below, exemplary embodiments will be described in detail with reference to accompanying drawings so as to be easily understood by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram of a display system 1 according to an exemplary embodiment.

As shown therein, the display system 1 according to this exemplary embodiment includes display apparatuses 100, 300 and 500 which process an image signal supplied by an external image supply source (not shown) according to a preset image processing operation and display an image based on the processed image signal. Upgrading apparatuses 200, 400 and 600 upgrade hardware/software of the display apparatuses 100, 300 and 500.

The display apparatuses 100, 300 and 500 may be implemented, e.g., as a TV and may perform an image displaying function, a multimedia content playing function and a network function of an external image device. The display apparatuses 100, 300 and 500 are connected to the upgrading apparatuses 200, 400 and 600 which perform an upgraded function.

The display apparatuses 100, 300 and 500 may display a broadcasting image based on broadcasting signals/broadcasting information/broadcasting data transmitted by a transmission apparatus of a broadcasting station. The display apparatuses 100, 300 and 500 may display a video, still image, applications, on screen display (OSD), a graphic user interface (GUI) to control various operations, based on signals/data transmitted by various image supply sources (not shown).

The upgrading apparatuses 200, 400 and 600 of the display system 1 may include an image processor which is upgraded from an image processor of the display apparatuses 100, 300 and 500. The upgrading apparatuses 200, 400 and 600 may include a controller which is upgraded from a controller of the display apparatuses 100, 300 and 500. The display apparatuses 100, 300 and 500 may replace their functions with upgraded functions of the upgrading apparatuses 200, 400 and 600 or may concurrently perform the functions of the display apparatuses 100, 300 and 500 and the functions of the upgrading apparatuses 200, 400 and 600.

The upgrading apparatuses 200, 400 and 600 are connected to the display apparatuses 100, 300 and 500 for communication therewith. The upgrading apparatuses 200, 400 and 600 upgrade existing hardware/software of the connected display apparatuses 100, 300 and 500 so that the upgraded hardware/software of the display apparatuses 100, 300 and 500 process an image signal and display an image with improved quality.

The upgrading apparatuses 200, 400 and 600 may be connected to the display apparatuses 100, 300 and 500 in a wired/wireless manner. The upgrading apparatuses 200, 400 and 600 may exchange data/information/signals/power with the display apparatuses 100, 300 and 500.

Hereinafter, configurations of the display apparatus 100 and the upgrading apparatus 200 according to a first exemplary embodiment will be described with reference to FIGS. 2 and 3.

Figure 2:
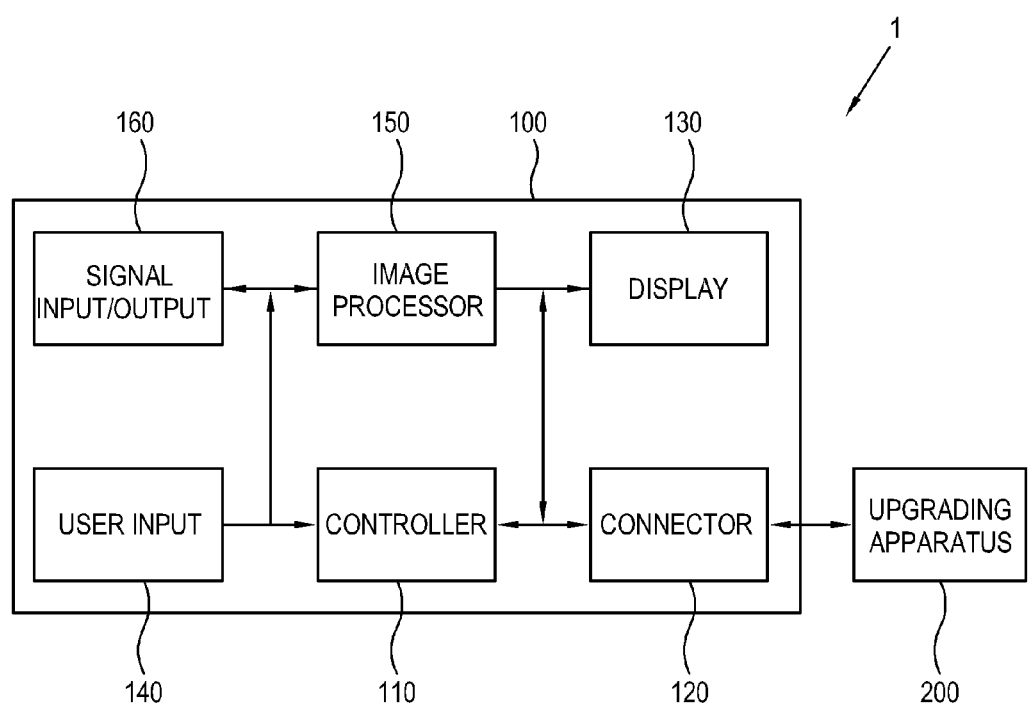
FIG. 2 is a block diagram of a display apparatus according to a first exemplary embodiment.
Figure 3:
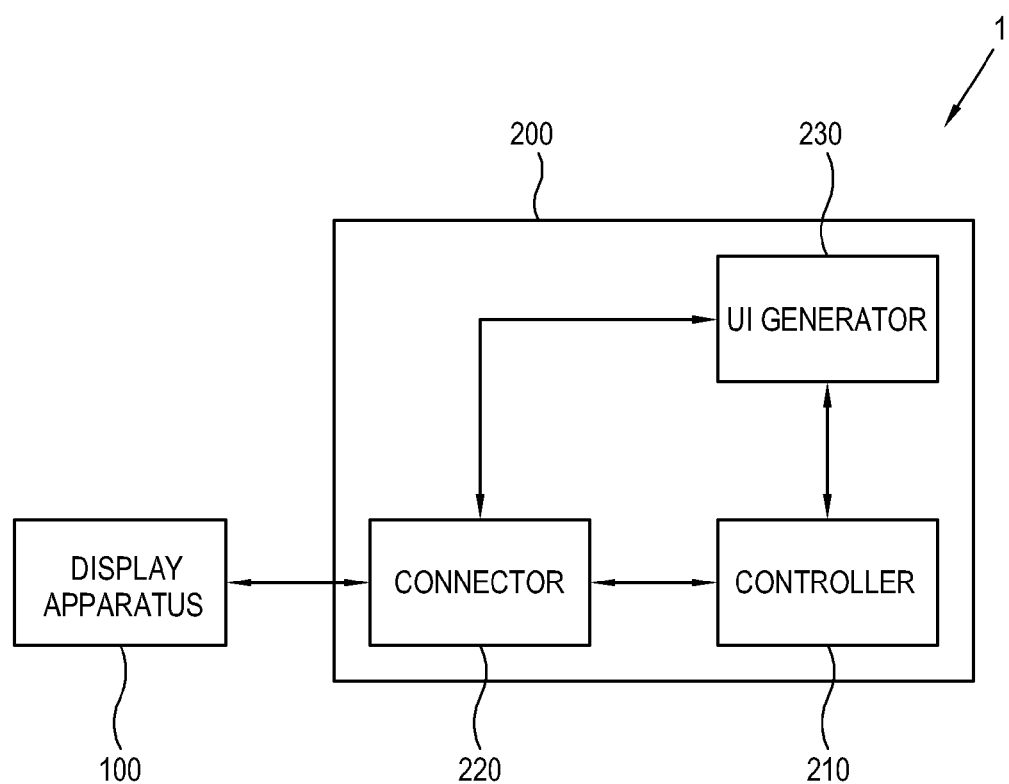
FIG. 3 is a block diagram of an upgrading apparatus according to the first exemplary embodiment.

FIG. 2 is a block diagram of the display apparatus 100 which, together with the upgrading apparatus 200, forms the display system 1.

As shown in FIG. 2, the display apparatus 100 includes a signal input/output 160 which is used to input/output at least one image signal, an image processor 150 which processes the image signal received through the signal input/output unit 160, a display 130 which displays an image thereon based on the image signal processed by the image processor 150, a user input 140 which receives a user's selection, a storage device (not shown) which stores data/information therein, a connector 120 which is connected to the upgrading apparatus 200, and a controller 110 which controls overall operations of the display apparatus 100.

The signal input/output 160 transmits a received image signal to the image processor 150. The image signal varies depending on a standard of a received image signal or based on an embodiment of an image supply source and the display apparatus 100. For example, the signal input/output 160 may receive signals/data according to high definition multimedia interface (HDMI), universal serial bus (USB), Component and other standards and includes a plurality of connection terminals (not shown) which correspond to the foregoing standards.

The image processor 150 processes an image signal transmitted by the signal input/output unit 160 and an image signal supplied by an image supply source (not shown); according to various preset image processing operations. The image processor 150 outputs the processed image signal to the display 130 in order to display an image on the display 130 based on the image signal.

The image processing operation of the image processor 150 may include, but is not limited to, a de-multiplexing operation for dividing a predetermined signal according to its nature, a decoding operation which corresponds to an image format of an image signal, a de-interlacing operation which converts an interlaced image signal into a progressive image signal, a scaling operation which adjusts an image signal to a preset resolution, a noise reduction operation which improves image quality, a detail enhancement operation, a frame refresh rate conversion, etc.

The image processor 150 may be implemented as an image processing board (not shown) which is formed by mounting various chipsets (not shown), memories (not shown), electronic parts (not shown), wirings (not shown), etc. on a printed circuit board (PCB) (not shown) to perform the foregoing image processing operations.

The display 130 displays an image thereon based on an image signal output by the image processor 150. The display 130 may be implemented as any one of various display panels including liquid crystal, plasma, light-emitting diode (LED), organic light-emitting diode (OLED), surface-conduction electron-emitter, carbon nano-tube, and nano-crystal, but is not limited thereto.

According to an exemplary embodiment, the display 130 displays a UI screen generated by the upgrading apparatus 200; which will be described later.

The user input 140 transmits various preset control commands or unlimited information to the controller 110 through a user's manipulation and input. The user input 140 may be implemented as a menu key and as an input panel installed in an external part of the display apparatus 100, or may be implemented as a remote controller which is separated/spaced from the display apparatus 100.

The user input 140 may be integrally formed in the display 130. That is, in response to the display 130 including a touch screen, a user may transmit a preset command to the controller 110 through an input menu (not shown) which is displayed on the display 130.

According to an exemplary embodiment, the user input 140 receives a user's selection for performing the upgrading function selected from at least one upgrading function list displayed on the display 130.

The user input 140 receives a user's selection for adding or changing the performed upgrading function.

The storage device (not shown) stores therein unlimited data under the control of the controller 110. The storage device may be implemented as a non-volatile memory such as a flash memory or a hard disc drive. The storage device is accessed by the controller 110, and data stored therein may be read/recorded/modified/deleted/updated by the controller 110.

The data stored in the storage device may include an operating system (OS) for driving the display apparatus 100, various applications which are executed on the OS, image data, additional data and setting information.

To communicate with the upgrading apparatus 200, the connector 120 may include a connection port which complies with standards such as HDMI, USB, and Component or Low Voltage Differential Signaling (LVDS).

As long as the connector 120 may exchange at least one of data, signals, information and power with the upgrading apparatus 200, it may be implemented in various types and forms.

The controller 110 performs control operations for various elements of the upgrading apparatus 200. For example, the controller 110 controls the image processor 150 to process an image signal, controls the connector 120 to transmit and receive signals/information/data, and performs a control operation in response to a command from the user input 140 to thereby control overall operations of the display apparatus 100.

Upon connection of the upgrading apparatus 200, the controller 110 communicates with the upgrading apparatus 200, and controls the upgrading apparatus 200 to generate a UI screen which displays at least one upgrading function list.

The controller 110 may control the display 130 to display thereon the generated UI screen transmitted by the upgrading apparatus 200, and may perform the upgrading function selected as a result of a user's selection, which is input through the user input 140.

The controller 110 may control the upgrading apparatus 200 to generate a UI screen which displays the upgrading function list selected by a user.

In response to a user's selection, which is input through the user input 140, being changed, the controller 110 may perform the upgrading function which corresponds to the changed selection.

Hereinafter, a configuration of the upgrading apparatus 200 will be described.

The upgrading apparatus 200 includes a connector 220 which is connected to the connector 120 of the display apparatus 100, a storage device (not shown) which stores unlimited data/information therein, a UI generator 230, and a controller 210 which controls overall operations of the upgrading apparatus 200.

The upgrading apparatus 200 may include an image processor (not shown), which may process an image signal on behalf of the image processor 150 of the display apparatus 100 or may replace a part of the entire image processing operation. For example, the image processor of the upgrading apparatus 200 may process an image signal with a resolution higher than the resolution that is processed by the image processor 150 of the display apparatus 100, or may process an image signal having a format that may not be processed by the image processor 150.

The connector 220 is connected to the connector 120 in order to enable communication between the upgrading apparatus 200 and the display apparatus 100. The connector 220 may be connected to the connector 120 in a wired/wireless manner. The method of connection may vary.

For example, the connector 220 may include a connection port complying with standards such as HDMI, USB, and Component or LVDS.

As long as the connector 220 may exchange at least one of data, signals, information and power with the display apparatus 100, it may be implemented in various types and forms.

The storage device stores therein unlimited data. The storage device may be implemented as a non-volatile memory such as a flash memory or may be implemented as a hard disc drive. The storage device is accessed by the controller 110 of the display apparatus 100 or by the controller 210, and data stored therein may be read/recorded/modified/deleted/updated by the controller 110 of the display apparatus 100 or by the controller 210.

The controller 210 controls a connection operation between the display apparatus 100 and the upgrading apparatus 200 to perform the overall image processing operation.

The controller 210 communicates with the display apparatus 100, controls an operation of the UI generator 230, controls the UI generator 230 to generate a UI screen displaying at least one upgrading function list provided by the upgrading apparatus 200, and transmits the generated UI screen to the display apparatus 100.

The controller 210 may control the UI generator 230 to generate a UI screen displaying at least one upgrading function list selected through a user's selection which is input through the user input 140.

In response to a user's selection which is input through the user input unit 140 being changed, the controller 210 may control the UI generator 230 to generate a UI screen which displays the upgrading function list which corresponds to the changed selection.

Hereinafter, configurations of the display apparatus 300 and the upgrading apparatus 400 according to a second exemplary embodiment will be described with reference to FIG. 4.

Figure 4:
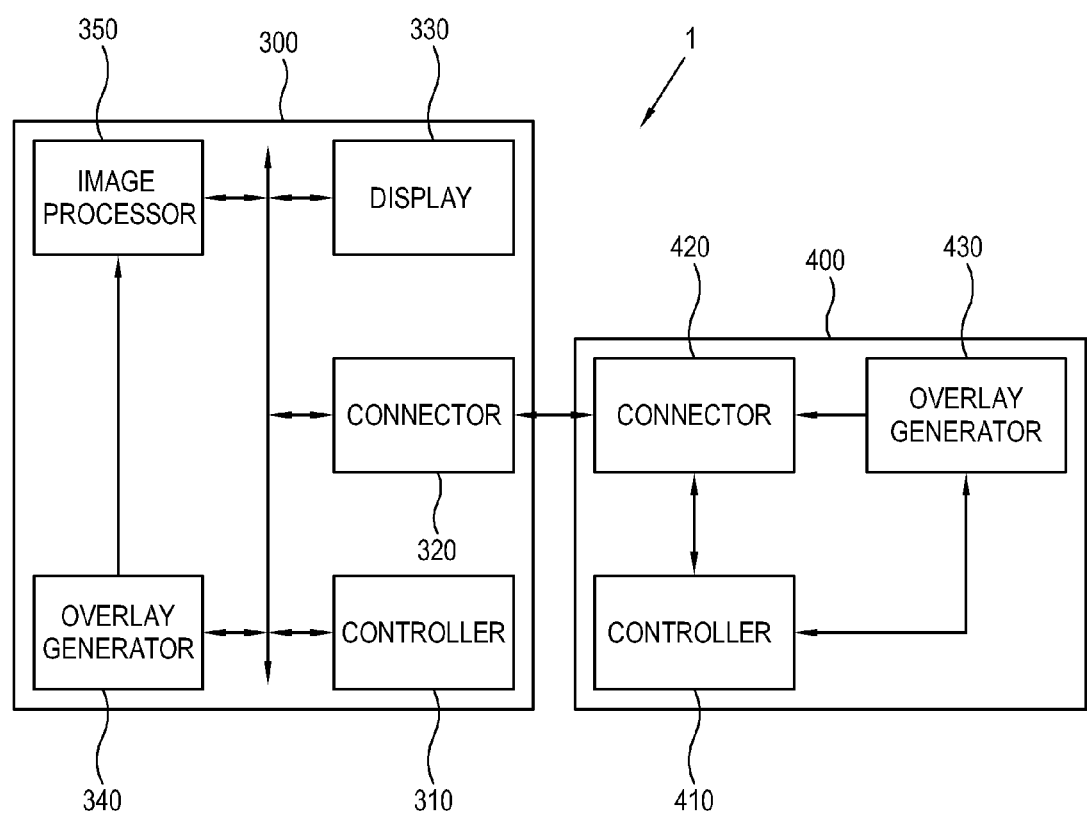
FIG. 4 is a block diagram of a display apparatus and an upgrading apparatus according to a second exemplary embodiment.

Referring to FIG. 4, the display apparatus 300 according to a second exemplary embodiment includes a signal input/output (not shown) which is used to input/output at least one image signal, an overlay generator 340 which generates an overlay, an image processor 350 which processes an image signal, a display 330 which displays an image thereon based on the image signal processed by the image processor 350, a user input (not shown), a storage device (not shown) which stores data/information therein, a connector 320 which is connected to the upgrading apparatus 400, and a controller 310 which controls overall operations of the display apparatus 300.

The signal input/output, the image processor 350, the display 330, the user input, the storage device, and the connector 320 according to a second exemplary embodiment are identical/similar to the corresponding elements of the first exemplary embodiment. Repetitive description will be omitted.

The overlay generator 340 generates an overlay screen such as a menu screen or Internet screen which will overlap a main screen on the display 330, based on graphic data stored in the storage device. The overlay generator 340 according to this exemplary embodiment may be included in the image processor 350 rather than separately provided as in FIG. 4.

In response to the upgrading apparatus 400 being connected to the connector 320, the controller 310 communicates with the upgrading apparatus 400 so that the upgrading apparatus 400 may generate an upgraded overlay screen. The controller 310 receives the generated upgraded overlay screen from the upgrading apparatus 400. The controller 310 controls the received upgrading overlay screen to overlap a main screen on the display 330.

The controller 310 may control at least one of the overlay screen generated by the overlap generator 340 and an upgraded overlay screen generated by the upgrading apparatus 400 to overlap the main screen on the display 330.

As shown in FIG. 4, the upgrading apparatus 400 according to the second exemplary embodiment includes a connector 420 which is connected to the connector 320 of the display apparatus 300, a storage device (not shown), an overlay generator 430, and a controller 410 which controls overall operations of the upgrading apparatus 400. The upgrading apparatus 400 according to the second exemplary embodiment may include the UI generator according to the first exemplary embodiment.

The overlay generator 430 generates an upgraded overlay screen which will overlap a main screen such as a menu screen or Internet screen relating to the function of the upgrading apparatus 400 in the display apparatus 300, based on graphic data stored in the storage device of the upgrading apparatus 400.

The controller 410 controls a connection operation between the display apparatus 300 and the upgrading apparatus 400, in order to perform the upgrading function.

Upon connection to the display apparatus 300 through the connector 420, the controller 410 communicates with the display apparatus 300, and controls the overlay generator 430 which generates an upgraded overlay screen.

The upgraded overlay screen which is generated by the overlay generator 430 may display at least one upgrading function list included in the upgrading apparatus 400.

The controller 410 transmits the generated overlay screen to the display apparatus 300 to display the generated upgraded overlay screen on the display 330.

Hereinafter, configurations of the display apparatus 500 and the upgrading apparatus 600 according to a third exemplary embodiment will be described with reference to FIG. 5. Elements which are substantially identical to the elements according to the first exemplary embodiment will not be described.

Figure 5:
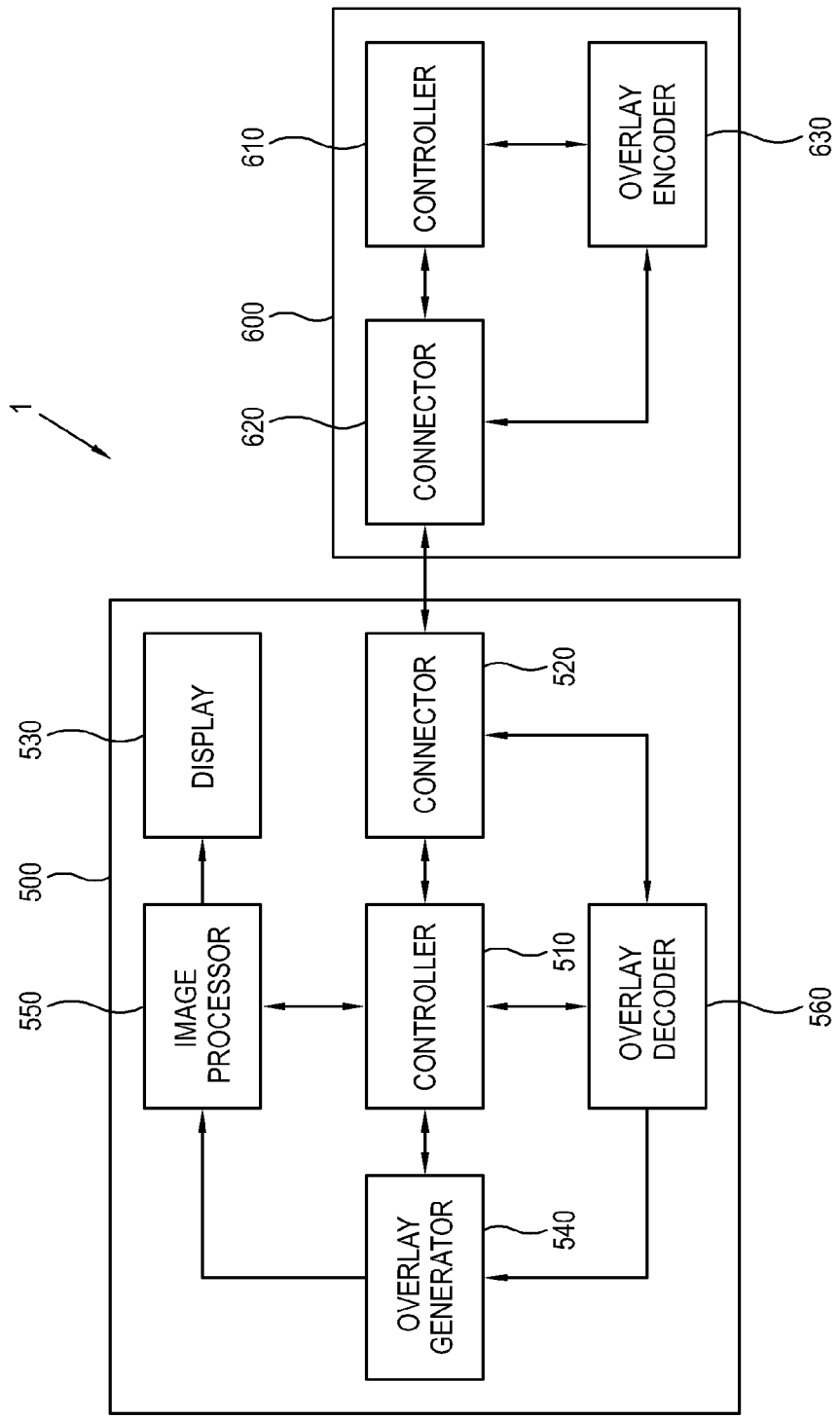
FIG. 5 is a block diagram of a display apparatus and an upgrading apparatus according to a third exemplary embodiment.

Referring to FIG. 5, the display apparatus 500 according to a third exemplary embodiment includes a signal input/output (not shown) which is used to input/output at least one image signal, an overlay generator 540 which generates an overlay, an overlay decoder 560 which decodes an encoded overlay screen, an image processor 550 which processes an image signal, a display 530 which displays an image based on an image signal processed by the image processor 550, a user input (not shown), a storage device (not shown) which stores data/information therein, a connector 520 which is connected to the upgrading apparatus 600, and a controller 510 which controls overall operations of the display apparatus 500. The overlay generator 540 and the overlay decoder 560 of the display apparatus 500 may be included in the image processor 550 rather than separately provided, as illustrated in FIG. 5.

The upgrading apparatus 600 according to the third exemplary embodiment includes a connector 620 which is connected to the connector 520 of the display apparatus 500, a storage device (not shown), an overlay encoder 630, and a controller 610 which controls overall operations of the upgrading apparatus 600. The upgrading apparatus 600 may include a UI generator (not shown) according to the first exemplary embodiment.

The overlay decoder 560 which is included in the display apparatus 500 in FIG. 5 decodes the encoded overlay screen data which has been transmitted by the upgrading apparatus 600, and transmits the decoded overlay screen data to the overlay generator 540.

In response to the upgrading apparatus 600 being connected to the connector 520, the controller 510 communicates with the upgrading apparatus 600 so that the upgrading apparatus 600 may encode the upgraded overlay screen data.

The controller 510 controls the overlay decoder 560 to decode the encoded overlay screen data which has been transmitted by the upgrading apparatus 600, and controls the overlay generator 540 to generate an overlay screen.

The controller 510 controls the upgraded overlay screen, i.e., a second overlay screen generated by the overlay generator 540 to overlap a main screen on the display 530.

The controller 510 may control at least one of the first overlay screen and the second overlay screen generated by the overlay generator 540 to overlap a main screen on the display 530 based on graphic data stored in advance in the storage device of the display apparatus 500.

The overlay encoder 630 of the upgrading apparatus 600 in FIG. 5 encodes an upgraded overlay screen based on the graphic data stored in the storage device of the upgrading apparatus 600.

In response to the display apparatus 500 being connected to the connector 620, the controller 610 communicates with the display apparatus 500 and controls the overlay encoder 630 to encode the upgraded overlay screen data.

The controller 610 may transmit the encoded overlay screen data to the display apparatus 500 through the connector 620.

The controller 610 may control the display apparatus 500 to be updated so that the display apparatus 500 may generate the encoded upgraded overlay screen. For example, the version-up (or updated version) OS which is stored in the storage device of the upgrading apparatus 600 may upgrade the OS of the display apparatus 500 so that the display apparatus 500 may generate the upgraded overlay screen.

Hereinafter, a method of controlling the display apparatus 100 according to the first exemplary embodiment will be described with reference to FIG. 6.

As shown therein, the display apparatus 100 identifies whether the upgrading apparatus 200 is connected to the connector 120 (S100). In response to the upgrading apparatus 200 being connected thereto, the display apparatus 100 communicates with the upgrading apparatus 200 so that the upgrading apparatus 200 generates a UI screen which displays at least one upgrading function list (S110). Then, the display apparatus 100 receives the UI screen generated by the upgrading apparatus 200, through the connector 120 and displays the received UI screen on the display unit (S120). The display apparatus 100 then controls the upgrading function selected by a user and input through the user input 140, to be performed (S130).

In response to a command being input through the user input 140, the display apparatus 100 may control the upgrading apparatus 200 to generate the UI screen which displays at least one upgrading function list selected by a user.

In response to a user's selection which is input through the user input 140 being changed, the display apparatus 100 may control the upgrading apparatus 200 to perform the upgrading function which corresponds to the changed selection.

Figure 7:
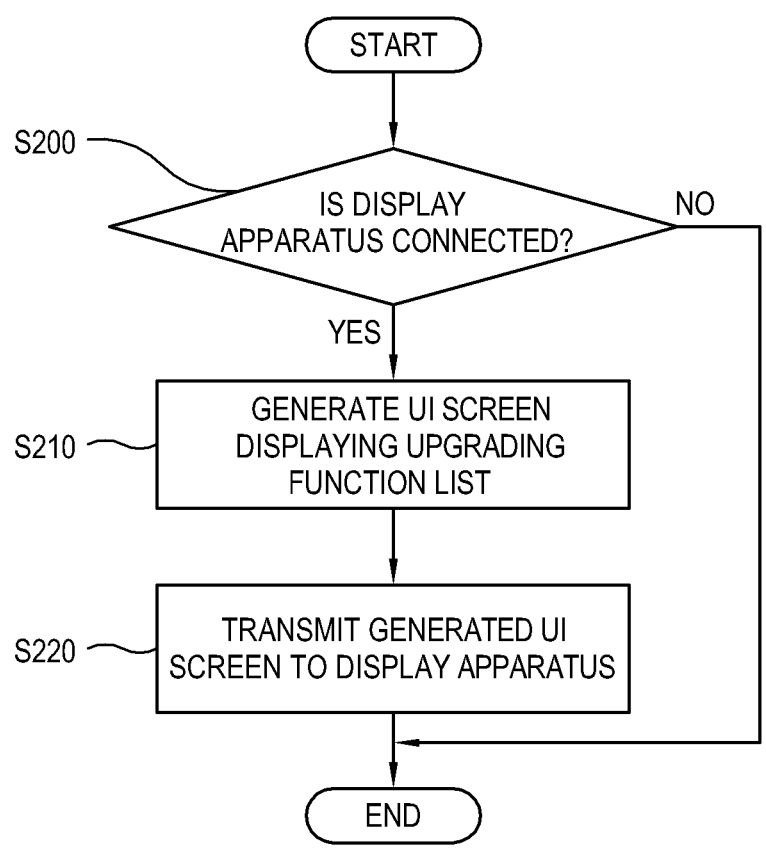
FIG. 7 is a flowchart showing a method of controlling the upgrading apparatus according to the first exemplary embodiment.

Hereinafter, a method of controlling the upgrading apparatus 200 according to the first exemplary embodiment will be described with reference to FIG. 7.

As shown therein, the upgrading apparatus 200 identifies whether the display apparatus 100 is connected to the connector 220 (S200). In response to the display apparatus 100 being connected thereto, the upgrading apparatus 200 communicates with the display apparatus 100 and generates a UI screen which displays the upgrading function list provided by the upgrading apparatus 200 (S210). The upgrading apparatus 200 transmits the generated UI screen to the display apparatus 100 through the connector 220 (S220).

In response to a command being input through the user input 140, the upgrading apparatus 200 may control the UI generator 230 to generate the UI screen which displays at least one upgrading function list selected by a user.

In response to a change to a user's selection which is input through the user input unit 140, the upgrading apparatus 200 may control the UI generator 230 to generate a UI screen which displays the upgrading function list which corresponds to the changed selection.

Hereinafter, an example of a UI screen displayed by the display apparatus 100 will be described.

Figure 8:
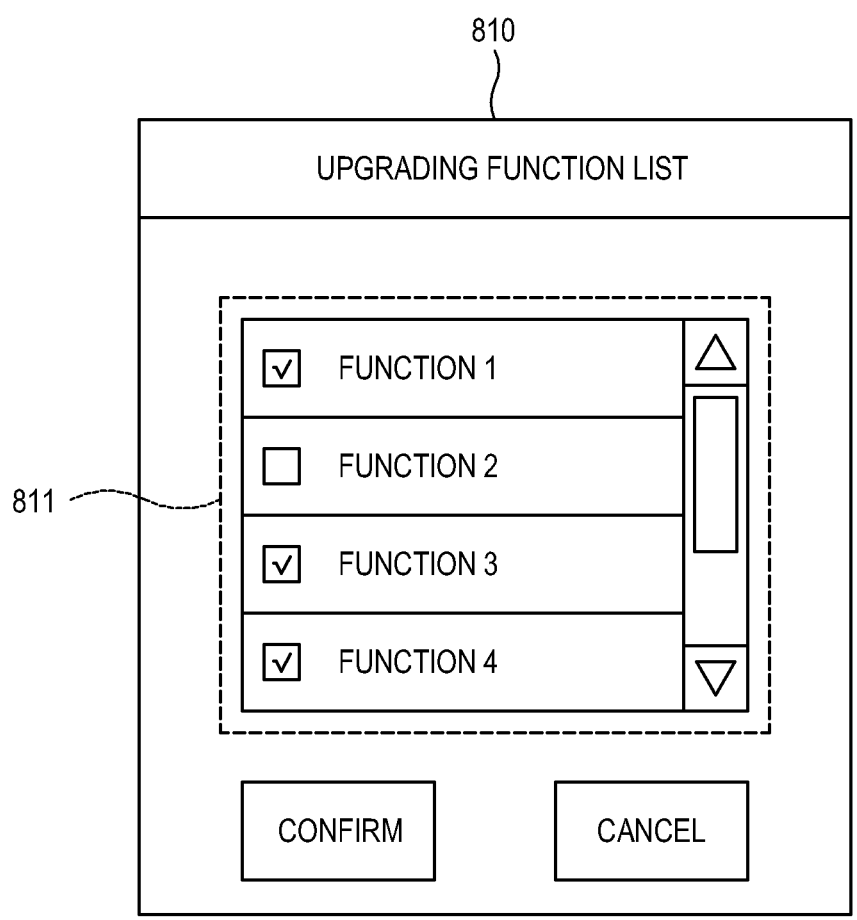
FIG. 8 illustrates an example of a user interface (UI) screen of an upgrading function list displayed by the display apparatus according to the first exemplary embodiment.

As shown in FIG. 8, the upgrading apparatus 200 which is connected to the display apparatus 100 may provide various functions.

A UI screen 810 includes a list 811 which includes an item of at least one upgrading function. The list 811 displays selectable items such as function 1 and function 2 with regard to respective upgrading functions. At least one of the respective function items in the list 811 may be selected or may be clicked by a user through the user input 140. FIG. 8 illustrates the functions 1, 3 and 4 which a user selects by checking a check box provided in the left side of each item. According to this exemplary embodiment, only the upgrading functions which are selected by a user may be performed according to the user's selection.

Figure 9:
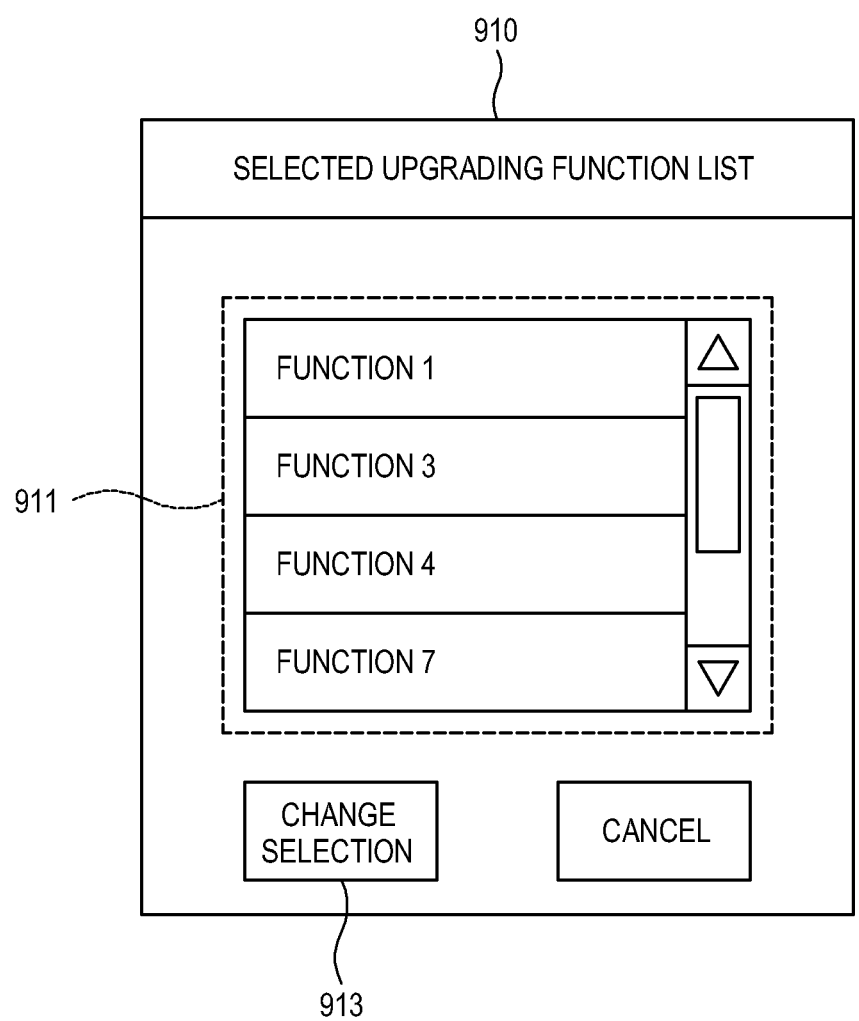
FIG. 9 illustrates an example of a UI screen of an upgraded function list selected by a user and displayed by the display apparatus according to the first exemplary embodiment.

FIG. 9 illustrates an example of a UI screen which displays an upgrading function list which has been selected by a user.

As shown in FIG. 8, in response to a user selecting function 1, function 3, function 4 and function 7 from the list, only the upgrading functions which have been selected by a user are performed. In response to a command being input through the user input 140, a UI screen 910 which shows an upgrading function list 911 selected by a user may be displayed in response to a user's request.

Figure 6:
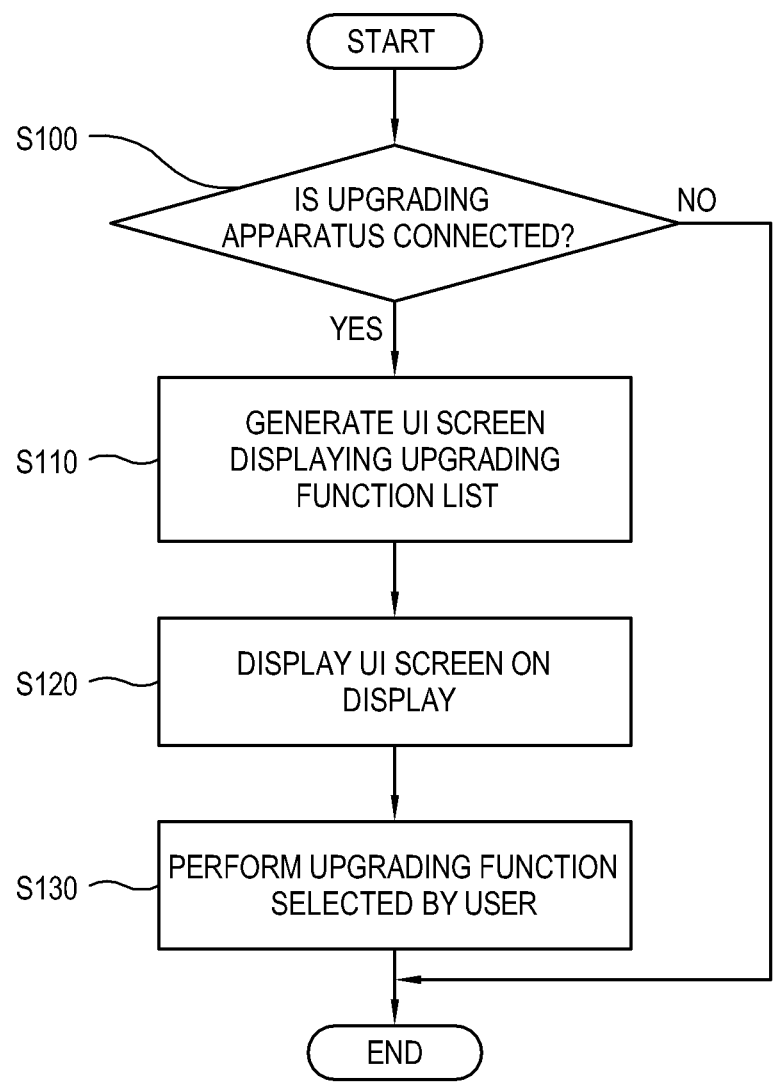
FIG. 6 is a flowchart showing a method of controlling the display apparatus according to the first exemplary embodiment.

If a user desires to change his/her selection regarding the selected upgrading function item, he/she may click on change selection 913 and the UI screen 810 shown in FIG. 6 is displayed. Then, a user may change the selection of the items by selecting or clicking the check box which corresponds to the respective items. According to this exemplary embodiment, the display apparatus 100 may control the upgrading function which corresponds to the changed selection to be performed.

Hereinafter, a method of controlling the display apparatus 300 and a method of controlling the upgrading apparatus 400 of the display apparatus 300 according, to the second exemplary embodiment, will be described with reference to FIGS. 10 and 11.

Figure 10:
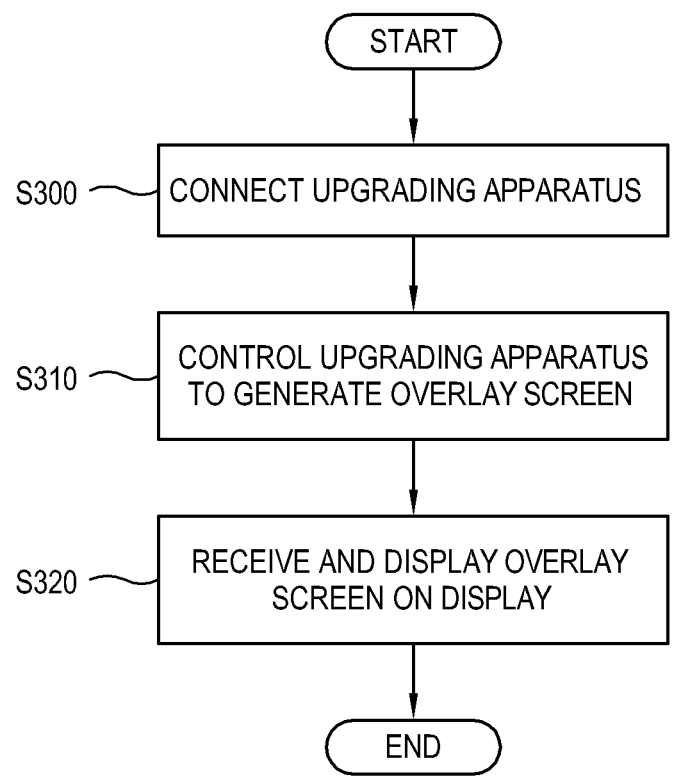
FIG. 10 is a flowchart showing a method of controlling the display apparatus according to the second exemplary embodiment.

As shown in FIG. 10, in the control method of display apparatus 300, the upgrading apparatus 400 is connected to the display apparatus 300 through the connector 320 (S300). The display apparatus 300 communicates with the upgrading apparatus 400 so that the upgrading apparatus 400 generates an overlay screen (S310). The display apparatus 300 receives the generated overlay screen from the upgrading apparatus 400 and displays the overlay screen by overlapping a main screen on the display (S320).

The method of controlling the display apparatus 300 may further include an operation of displaying at least one of the overlay screen generated by the display apparatus 300 and the overlay screen generated by the upgrading apparatus 400 to overlap a main screen on the display.

Figure 11:
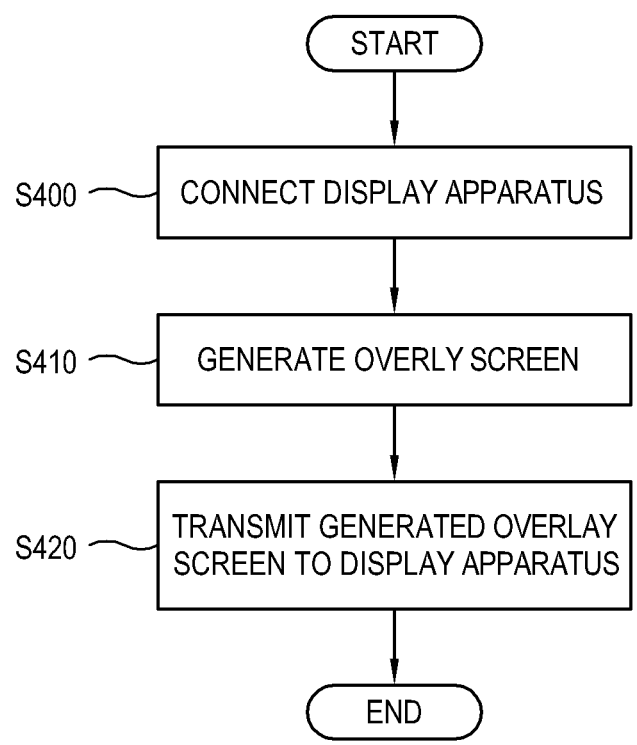
FIG. 11 is a flowchart showing a method of controlling the upgrading apparatus according to the second exemplary embodiment.

As shown in FIG. 11, in the method of controlling the upgrading apparatus 400 of the display apparatus 300, the display apparatus 300 is connected to the upgrading apparatus 400 through the connector 420 (S400). The upgrading apparatus 400 communicates with the display apparatus 300 and generates the upgraded overlay screen through the overlay generator 430 (S410). The upgrading apparatus 400 transmits the overlay screen to the display apparatus 300 through the connector 420 to display the generated upgraded overlay screen in the display apparatus 300 (S420).

Hereinafter, a control of controlling the display apparatus 500 and a method of controlling the upgrading apparatus 600, according to a third exemplary embodiment, will be described with reference to FIGS. 12 and 13.

Figure 12:
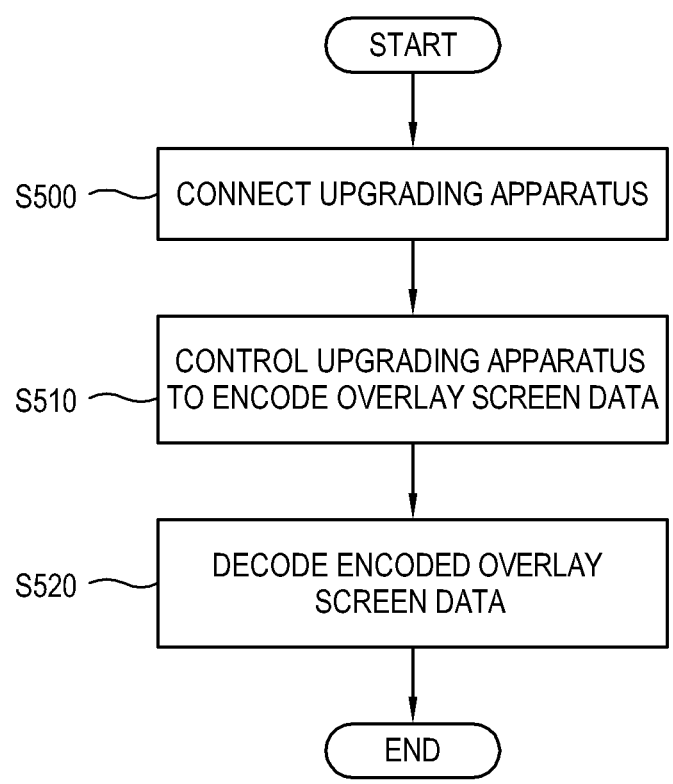
FIG. 12 is a flowchart showing a method of controlling the display apparatus according to a third exemplary embodiment.

Referring to FIG. 12, in the method of controlling the display apparatus 500 according to the third exemplary embodiment, the upgrading apparatus 600 which upgrades the display apparatus 500 is connected to the connector 520 (S500). The display apparatus 500 communicates with the upgrading apparatus 600 so that the upgrading apparatus 600 encodes the upgraded overlay screen data (S510). The display apparatus 500 receives the encoded overlay screen data and controls the overlay decoder 560 to decode the data (S520).

The display apparatus 500 displays the overlay screen which is generated on the basis of the decoded overlay screen data, on the display by overlapping the main screen on the display.

Figure 13:
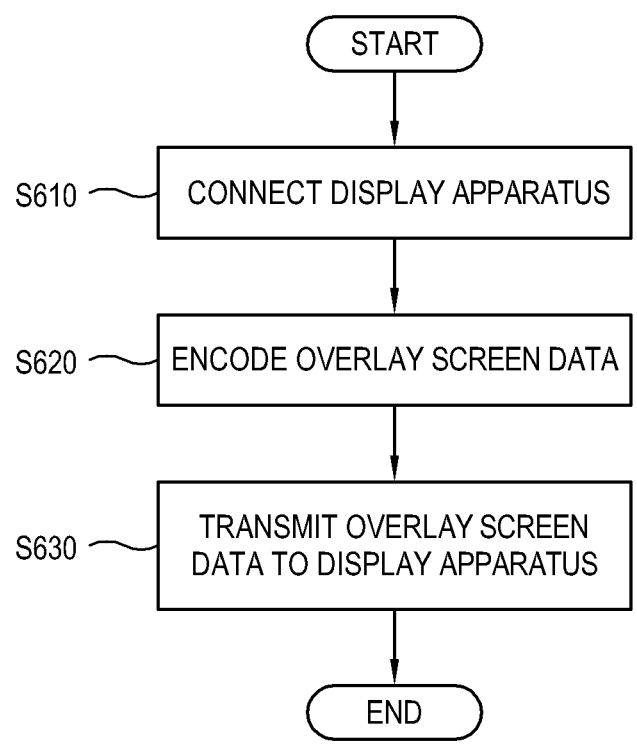
FIG. 13 is a flowchart showing a method of controlling the upgrading apparatus according to the third exemplary embodiment.

Referring to FIG. 13, in the method of controlling the upgrading apparatus 600 of the display apparatus 500 according to the third exemplary embodiment, the upgrading apparatus 600 is connected to the display apparatus 500 through the connector 620 (S610). The upgrading apparatus 600 communicates with the display apparatus 500 and controls the overlay encoder 630 to encode the upgraded overlay screen data (S620). The upgrading apparatus 600 transmits the encoded overlay screen data to the display apparatus 500 through the connector 620 (S630).

As described above, only the functions of the display apparatus, as desired by a user, may be upgraded according to a user's selection, out of the various functions of the upgrading apparatus.

According to an exemplary embodiment, a display apparatus, an upgrading apparatus, a display system and a method of controlling the same, which generates an improved upgraded overlay, may be provided.

Although a few exemplary embodiments have been shown and described, it will be appreciated by those skilled in the art that changes may be made in these exemplary embodiments without departing from the principles and spirit of the inventive concept, the range of which is defined in the appended claims and their equivalents.

What is claimed is:

1. A display apparatus comprising:
    an image processor configured to process an image signal;
    a display configured to display a processed image of the processed image signal;
    a connector configured to connect to an upgrading apparatus, the upgrading apparatus configured to provide at least one upgrading function to the display apparatus, the at least one upgrading function replacing at least a part of an image processing operation of the display apparatus; and
    a controller configured to communicate with the upgrading apparatus and to control the display to display a first user interface (UI) screen generated by the upgrading apparatus, the first UI screen comprising a list of the at least one upgrading function.

2. The display apparatus according to claim 1, further comprising a user input configured to receive a user selection of at least one upgrading function from the list of the at least one upgrading function,
    wherein the controller is further configured to control the selected at least one upgrading function to be performed.

3. The display apparatus according to claim 2, wherein the controller is further configured to control the upgrading apparatus to generate a second UI screen comprising a list of the selected at least one upgrading function.

4. The display apparatus according to claim 3, wherein the selected at least one upgrading function is changed according to a user input, and
wherein the controller is further configured to control the upgrading function corresponding to the changed selection to be performed.

5. The display apparatus according to claim 1, further comprising:
an overlay generator configured to generate a first overlay screen; and
an overlay decoder configured to decode overlay screen data encoded by the upgrading apparatus,
wherein the controller is further configured to control the overlay decoder to decode the encoded overlay screen data, to control the overlay generator to generate a second overlay screen, and controls the display to display a main screen overlapped with the second overlay screen.

6. The display apparatus according to claim 5, wherein the controller is configured to control the display to display the main screen overlapped at least one of the first overlay screen and the second overlay screen.

7. The display apparatus according to claim 1, wherein the connector is configured to directly and physically connect to the upgrading apparatus and complies with one of high definition multimedia interface (HDMI), Component, and Low Voltage Differential Signaling (LVDS).

8. A display apparatus comprising:
an image processor configured to process an image signal;
a display configured to display a processed image of the processed image signal;
a connector configured to connect to an upgrading apparatus, the upgrading apparatus configured to provide at least one upgrading function to the display apparatus; and
a controller configured to communicate with the upgrading apparatus and to control the display to display a first user interface (UI) screen generated by the upgrading apparatus, the first UI screen comprising a list of the at least one upgrading function,
wherein the controller is further configured to control the display to display a main screen generated by the controller overlapped with an overlay screen generated by the upgrading apparatus.

9. The display apparatus according to claim 8, further comprising an overlay generator,
wherein the controller is further configured to control the display to display the main screen overlapped with at least one of the overlay screen generated by the overlay generator and the overlay screen generated by the upgrading apparatus.

10. An upgrading apparatus of a display system, the display system having a display apparatus, the upgrading apparatus comprising:
a connector which is connectable to the display apparatus;
a user interface (UI) generator; and
a controller configured to provide at least one upgrading function to the display apparatus, the at least one upgrading function replacing at least a part of an image processing operation of the display apparatus, to control the UI generator to generate a first UI screen comprising a list of the at least one upgrading function, and to transmit the generated first UI screen to the display apparatus, when the display apparatus is connected to the upgrading apparatus.

11. The upgrading apparatus according to claim 10, wherein the controller is further configured to control the UI generator to generate a second UI screen comprising a list of at least one selected upgrading function selected from among the at least one upgrading function as a result of a user selection input to the display apparatus.

12. The upgrading apparatus according to claim 11, wherein the controller is further configured to control the UI generator to generate a third UI screen comprising an upgrading function list which corresponds to a changed selection in response to the user selection input to the display apparatus being changed.

13. The upgrading apparatus according to claim 10, further comprising an overlay generator configured to generate an overlay screen,
wherein the controller is further configured to control the overlay generator to generate an overlay screen and to transmit the generated overlay screen to the display apparatus through the connector.

14. The upgrading apparatus according to claim 10, further comprising an overlay encoder configured to encode overlay screen data,
wherein the controller is further configured to control the overlay encoder to encode the overlay screen data, and to transmit the encoded overlay screen data to the display apparatus through the connector.

15. The upgrading apparatus according to claim 14, wherein the controller is further configured to provide the at least one upgrading function to the display apparatus by processing an image resolution higher than an image resolution that the display apparatus is configured to process.

16. A method of controlling a display apparatus, the method comprising:
connecting an upgrading apparatus configured to provide at least one upgrading function to the display apparatus, the at least one upgrading function replacing at least a part of an image processing operation of the display apparatus;
communicating with the upgrading apparatus which generates user interface (UI) screen comprising a list of the at least one upgrading function; and
receiving the UI screen generated by the upgrading apparatus and displaying the UI screen on the display.

17. The control method according to claim 16, further comprising receiving a user selection regarding at least one of the at least one upgrading function list.

18. The control method according to claim 17, further comprising controlling at least one of the at least one upgrading function to be performed upon selection by the user.

19. A method of controlling an upgrading apparatus of a display system, the display system comprising a display apparatus connected to the upgrading apparatus, the method comprising:
generating a first UI screen comprising a list of at least one upgrading function, the upgrading apparatus configured to provide the at least one upgrading function to the display apparatus and the at least one upgrading function replacing at least a part of an image processing operation of the display apparatus; and
transmitting the first UI screen to the display apparatus in response to the display apparatus being connected to the upgrading apparatus.

20. The control method according to claim 19, further comprising generating a second UI screen comprising a list of at least one selected upgrading function selected according to a user selection input to the display apparatus.

21. The control method according to claim 20, further comprising generating a third UI screen comprising a list of at least one changed upgrading function which corresponds to a changed selection in response to a change in the user selection input to the display apparatus.

22. A display system comprising:
a display apparatus comprising a display; and
an upgrading apparatus connected to the display apparatus, the upgrading apparatus configured to provide at least one upgrading function to the display apparatus, the at least one upgrading function replacing at least a part of an image processing operation of the display apparatus,
wherein the display apparatus is configured to receive a user interface (UI) screen generated by the upgrading apparatus, the first UI screen comprising a list of the at least one upgrading function, and to display the list on the display.

23. The display system according to claim 22, wherein the upgrading apparatus is further configured to encode overlay screen data, and
wherein the display apparatus is further configured to receive the encoded overlay screen data, decode the encoded overlay screen data, and display an overlay screen overlapping a main screen on the display, the overlay screen generated on the basis of the decoded overlay screen data.

* * * * *